Dec. 15, 1931.  F. H. OWENS  1,836,038
PROJECTION PRINTER
Filed Sept. 10, 1926   2 Sheets-Sheet 2

INVENTOR
FREEMAN H. OWENS.
BY Philip S. Hopkins
ATTORNEY

Patented Dec. 15, 1931

1,836,038

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

PROJECTION PRINTER

Application filed September 10, 1926. Serial No. 134,669.

My invention relates generally to printers and particularly to that type known as projection printers wherein illuminated images, such as those of a negative film, are projected to and photographed upon a sensitized surface such as a positive film.

My invention has for its primary object the provision of optical means for simultaneously projecting and photographing two consecutive images or "frames" from the negative film, each on separate strips of positive film. Such a printing apparatus is especially useful in providing positive prints from a single negative film with consecutive images, for that type of camera projector which utilizes a double strip of film with the images printed alternately thereon.

Another important object lies in the fact that with this apparatus, the images on a single strip of standard size negative cinefilm may be photographed on one or more positive strips of half size film to be used in smaller than standard size projectors. It will be understood from the following that with my apparatus, slightly modified, any desired size of positive prints may be made from the single negative strip.

A still further object is to provide film driving means for driving both the negative and positive films, on the same shaft.

Another object is the provision of a novel type of shutter and driving mechanism for intermittently exposing the film strips and moving the negative and positive strips in opposite directions.

It is also an object to construct my apparatus with as few parts as possible thereby lending cheapness, simplicity and ease of operation thereto.

Other objects and advantages will be apparent as the description proceeds, reference being had to the accompanying drawings wherein like reference numerals indicate like parts.

In the drawings:—

Figure 1:
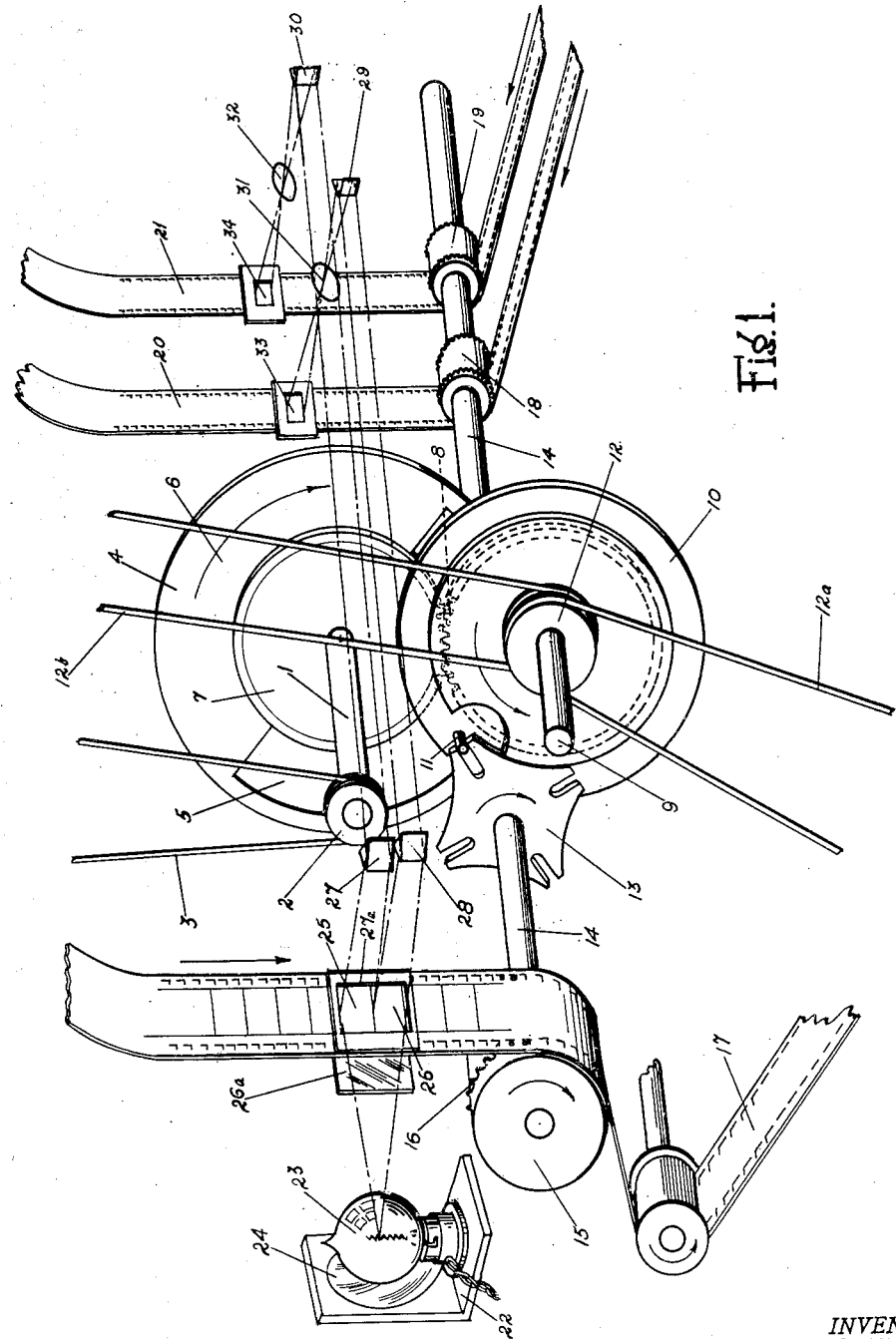
Figure 1 is a perspective diagrammatic view illustrating the assembly and operation of my invention.

In carrying out my invention, I provide a main drive shaft 1 provided with a pulley 2, and belt 3 running to any suitable source of power not shown. Secured to the shaft 1 is the disk shutter 4 provided with the exposure opening 5, and the cover blade 6 opposite said exposure opening. On the shaft 1, adjacent the shutter 4, is a gear 7 adapted to mesh with and drive gear 8 secured to the shaft 9. Also secured to the shaft 9 adjacent the gear 8 is a cam and flange 10 provided at one point on the flange with a laterally extending pin 11. On shaft 9 is a double pulley 12 from which belt 12a runs to the negative film take up, not shown, and belt 12b runs to the positive film take ups, not shown.

Upon rotation of the flange 10, the pin 11 thereof engages and rotates in one of the slots of a star wheel 13 of the well known Geneva type, which is secured to the shaft 14. Mounted on this shaft 14 on one side of the shutter 4 is a sprocket 15 provided with the usual sprocket teeth 16 adapted to engage in the perforations of a strip of negative film 17, whereby said film strip may be moved upon rotation of shaft 14.

The shaft 14 also carries, on the opposite side of the shutter 4, sprockets 18 and 19 preferably one fourth the size of the sprocket 15. The sprockets 18 and 19 are adapted to engage with and move the strips 20 and 21 of positive film which are to be exposed to the illuminated images 25 and 26 on the negative strip 17. It will be observed that the positive strips of film 20 and 21 are supported and driven on the opposite side of shaft 14 than is the negative strip, whereby said positive strips move in a direction opposite the movement of the negative strip.

Suitably located on one side of the negative film 17 is a bracket 22 supporting the light source 23 and reflector 24. The light from the lamp 23 is so adjusted as to pass through a suitable exposure opening 27a for two consecutive frames 25 and 26 on the negative film 17. It will be understood that any desired means for confining the light from the lamp 23 to the desired exposure opening for the negative may be provided. Also there is provided a suitable diffusing glass 26a. It should also be understood that this printing apparatus may be enclosed within a light tight casing (not shown) in order to protect the positive film from extraneous light. It is believed unnecessary to illustrate such common elements in detail and for this reason and for the purpose of clearness, the drawings have been made diagrammatic in character, omitting common and well known details.

The frame 25 on the negative film is illuminated and photographed through reflecting mediums, such as prisms 27 and 30, then through a lens 32, on to the positive film 21 through the exposure opening 34. At the same time, the frame 26 on the same negative film strip 17, is illuminated and photographed through reflecting mediums, such as prisms 28 and 29, then through a lens 31 on to the positive film strip 20 through a suitable exposure opening 33. Thus the illuminated images on frames 25 and 26 on the negative film are reflected by the prisms 27 and 28 at right angles to similar reflecting prisms or surfaces 29 and 30 where they are again turned at right angles, and then, passing through the lenses 31 and 32 respectively are exposed upon the positive film strips 20 and 21 respectively through the exposure openings 33 and 34.

Figure 2:
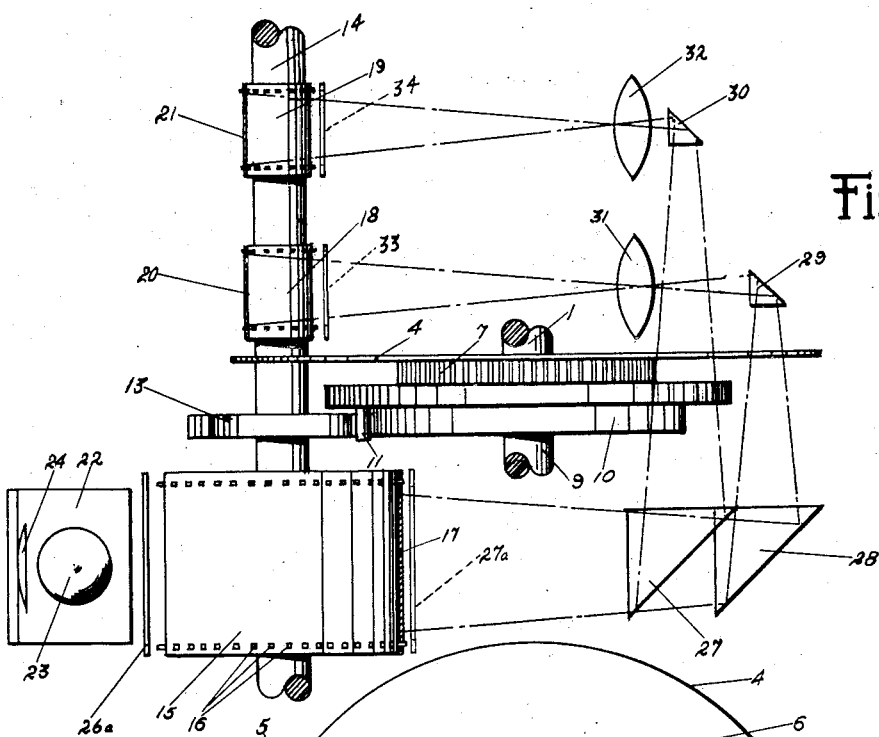
Figure 2 is a top plan view diagrammatically illustrating the method of projection and optical systems used in my invention.
Figure 3:
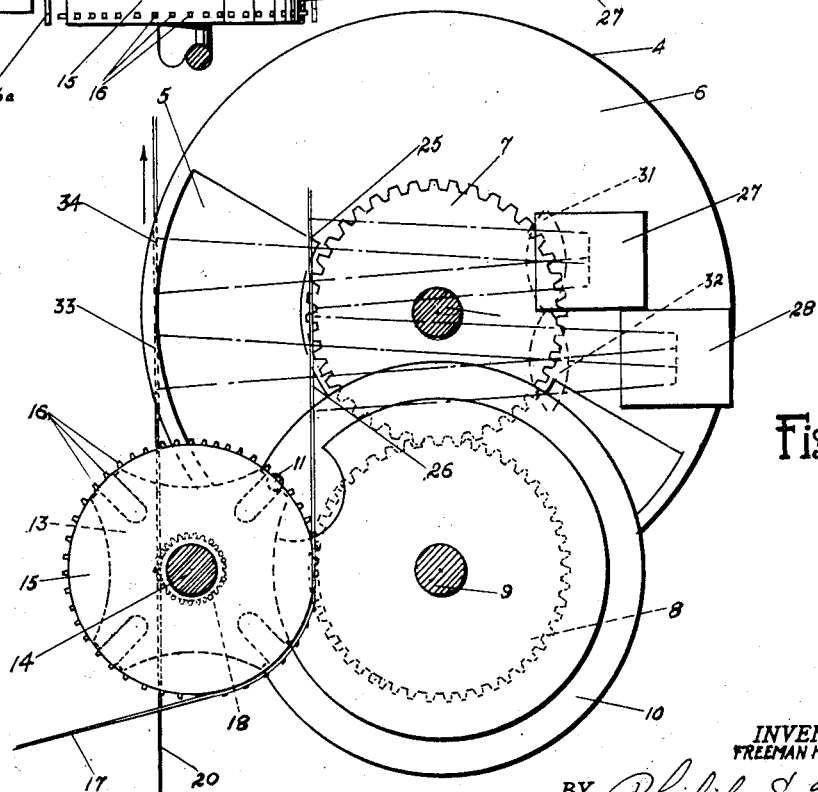
Figure 3 is a side view illustrating clearly the film driving mechanism and shutter.

It will be observed with reference to Figure 2 that the path of the reflected images from the negative film between prisms 27 and 28 and prisms 29 and 30, is intercepted by the shutter 4. When the cover blade 6 of the shutter 4 is in position to cut off the images between the prisms 27, 28 and 29, 30, as shown in Figure 1, the pin 11 on the flange 10 engages with the star wheel 13 to rotate shaft 14, thus bringing about a shifting simultaneously of the film strips 17, 20 and 21. When this shifting has been completed, the opening 5 in the shutter 4 reaches a position to permit the passage of the images therethrough, whereby they may be exposed on the positive film strips 20 and 21 through the lenses 31 and 32.

The sprocket 15 for the negative film is preferably approximately four times larger than the sprockets 18 and 19 for the positive film, and is so proportioned that upon each each 90° movement of said sprocket 15, the negative film 17 will be moved a distance equal to two standard image frames. The image frames on the positive film strips 20 and 21 are only half the size of the frames on the negative film, consequently, the 90° movement of the sprocket shaft 14 which moves the negative film a distance of two frames, will move the positive films a distance of one frame only.

Proper spacing of the reflecting prisms or surfaces 27, 28, 29, and 30 and lenses 31 and 32 with regard to each other and with respect to the exposure openings for both the negative and positive films, takes care of the proper focusing of the images for the adjustment thereof as to size and clearness.

It will be understood that, if desired, single consecutive images may be projected and photographed intermittently from the negative film to one or more positive films. In such event the sprockets for both negative and positive films would be of the same diameter, and an obvious rearrangement of the prisms and lenses would be necessary. My invention includes in its scope the use of any intermittent film driving mechanism on a single shaft and cooperating with an optical system and shutter for intermittently photographing images from a negative film to one or more positive films all supported by said film driving mechanisms.

In using the terms "negative" and "positive" films, I refer by "negative" to a sensitized film which has been exposed and developed, and by "positive" to a sensitized unexposed and undeveloped film.

In referring to the consecutive images projected simultaneously from the negative one to each of separate positives, I mean images which follow one another in sequence of exposure and action to normally provide the action of "motion" pictures, as distinguished from "complementary" images.

Many other changes in details of construction and operation may be made without departing from the spirit and scope of my invention. I do not limit myself therefore to the exact form shown other than by the appended claims.

I claim:—

1. A printing apparatus comprising a single intermittently driven shaft, means on said shaft for moving a strip of film having visible images thereon and a plurality of strips of sensitized film to receive said images, and means for intermittently projecting said images to said strips to be printed.

2. A printing apparatus comprising a single intermittently driven shaft, means on said shaft for moving a strip of film having visible images thereon and a plurality of strips of sensitized film to receive said images, and means for intermittently projecting said images to said strips to be printed, said means comprising reflecting surfaces and lenses.

3. A printing apparatus comprising a single intermittently driven shaft, means on said shaft for moving a strip of film having visible images thereon and a plurality of strips of sensitized film to receive said images, and means for intermittently projecting said images to said strips to be printed, said means comprising reflecting surfaces and lenses, and a shutter including means for driving said shaft.

4. A printing apparatus comprising a single intermittently driven shaft, means on said shaft for moving a strip of film having visible consecutive images thereon and two separate strips of sensitized film to receive said images, means for intermittently projecting two of said consecutive images, and means for simultaneously exposing one of said projected images on each of said two strips, whereby the alternate visible images of said first mentioned strips will be received consecutively on each of said two strips.

5. A printing apparatus comprising a shaft, a film sprocket thereon, for moving a strip of film having visible images thereon, a second sprocket on said shaft, for moving a strip of sensitized film adapted to receive said images, means for intermittently rotating said shaft, a light source on one side of said image bearing film and a reflecting surface on the opposite side to receive the images projected by said light, a second reflecting surface positioned opposite said sensitized film and adapted to receive and transmit said projected images from said first named reflecting surface to said image receiving film, and a shutter disposed between said reflecting surfaces to intermittently permit the passage of said images in accordance with the movement of said film strips.

6. A printing apparatus comprising a shaft, a relatively large sprocket thereon, for moving a relatively wide film strip having visible images thereon, two relatively small sprockets also on said shaft, for moving relatively narrow sensitized film strips for receiving said images, means for intermittently rotating said shaft whereby all of said film strips will be moved, said wider strip moving a greater distance than said narrow strips, and means for intermittently projecting two consecutive images from said wide strip, one to each of said narrow strips.

7. A printing apparatus comprising a shaft, a relatively large sprocket thereon, for moving a relatively wide film strip having visible images thereon, two relatively small sprockets also on said shaft, for moving relatively narrow sensitized film strips for receiving said images, means for intermittently rotating said shaft whereby all of said film strips will be moved, said wider strip moving a greater distance than said narrow strips, and means for intermittently projecting two consecutive images from said wide strip, one to each of said narrow strips, said means including reflecting surfaces and lenses cooperating with said projected images.

8. A printing apparatus comprising a shaft, a sprocket on said shaft for moving an image bearing strip of film, a second sprocket on said shaft for moving an image receiving strip of film, optical means for projecting the images from said first named strip to said second named strip, a rotatable shutter in the path of such projection, and means controlled by said shutter for intermittently rotating said sprocket shaft.

9. A printing apparatus comprising a shaft, film moving sprockets thereon, for moving strips of film lying in substantially the same plane, projection means including a light source, reflectors and lenses for projecting images from one of said films to the other, a shutter in the path of said reflectors, and means driven by said shutter for intermittently rotating said sprockets.

10. A printing apparatus comprising a shaft, film moving sprockets thereon, for moving strips of film lying in substantially the same plane, projection means including a light source, reflectors and lenses for projecting images from one of said films to the other, a shutter in the path of said reflectors, and means driven by said shutter for intermittently rotating said sprockets, said means including a star wheel on said shaft and a rotatable disk driven by said shutter and having a pin cooperating with said star wheel.

FREEMAN H. OWENS.